(12) United States Patent
Carlotto

(10) Patent No.: US 12,298,067 B2
(45) Date of Patent: *May 13, 2025

(54) INVENTORY INDICATION MECHANISM UTILIZING VISUAL INDICIA

(71) Applicant: WHIRLPOOL CORPORATION, Benton Harbor, MI (US)

(72) Inventor: Victor Carlotto, Giengen an der Brenz (DE)

(73) Assignee: Whirlpool Corporation, Benton Harbor, MI (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/321,246

(22) Filed: May 22, 2023

(65) Prior Publication Data

US 2023/0288136 A1    Sep. 14, 2023

Related U.S. Application Data

(63) Continuation of application No. 17/391,257, filed on Aug. 2, 2021, now Pat. No. 11,703,274, which is a continuation of application No. 16/176,192, filed on Oct. 31, 2018, now Pat. No. 11,112,168.

(51) Int. Cl.
*F25D 27/00*    (2006.01)
*F25D 11/02*    (2006.01)
*F25D 31/00*    (2006.01)
*G06Q 10/087*    (2023.01)

(52) U.S. Cl.
CPC ............ *F25D 27/005* (2013.01); *F25D 11/02* (2013.01); *F25D 31/007* (2013.01); *G06Q 10/087* (2013.01); *F25D 2331/803* (2013.01); *F25D 2500/06* (2013.01); *F25D 2700/123* (2013.01)

(58) Field of Classification Search
CPC ..................................................... F27D 27/005
See application file for complete search history.

(56) References Cited

U.S. PATENT DOCUMENTS 6,664,895 B2    12/2003    Zhu
7,380,410 B2    6/2008    Rand et al.
7,495,561 B2    2/2009    Bodin et al.
(Continued)

FOREIGN PATENT DOCUMENTS

DE    102011115146 A1    12/2012
DE    102017114798 A1    10/2018
EP    2696314 A1    2/2014

*Primary Examiner* — Christopher R Zerphey
(74) *Attorney, Agent, or Firm* — Price Heneveld LLP

(57) ABSTRACT

A refrigerating appliance includes a cabinet that defines an interior cavity. A temperature sensing network monitors a temperature stratification of the interior cavity. The temperature stratification includes a plurality of temperature levels that correspond to respective locations of the interior cavity. A controller is configured to receive an input related to an item to be stored. The controller is further configured to compare the input with the temperature stratification. The controller is further configured to identify a primary storage location of the item to be stored based upon a comparison of the input and the plurality of temperature levels of the temperature stratification. A visual indicia is disposed within the interior cavity and coupled to the controller. The visual indicia activates to identify the primary storage location of the item to be stored.

20 Claims, 10 Drawing Sheets

(56) References Cited

U.S. PATENT DOCUMENTS

| | | |
|---|---|---|
| 7,716,935 B2 | 5/2010 | Kim et al. |
| 9,195,960 B2 | 11/2015 | Kim |
| 11,112,168 B2 | 9/2021 | Carlotto |
| 11,703,274 B2 * | 7/2023 | Carlotto .................. F25D 11/02 62/62 |
| 2007/0295024 A1 | 12/2007 | Hallin et al. |
| 2009/0230137 A1 | 9/2009 | Rivier et al. |
| 2013/0186124 A1 | 7/2013 | Wiklinski et al. |
| 2016/0195328 A1 | 7/2016 | Frommelt et al. |
| 2017/0205138 A1 | 7/2017 | Hwang et al. |
| 2018/0080702 A1 | 3/2018 | Wilson |
| 2018/0080703 A1 | 3/2018 | Wilson |
| 2018/0089474 A1 | 3/2018 | Ramon et al. |
| 2018/0173487 A1 | 6/2018 | Nizzoli |
| 2021/0356201 A1 | 11/2021 | Carlotto |

\* cited by examiner

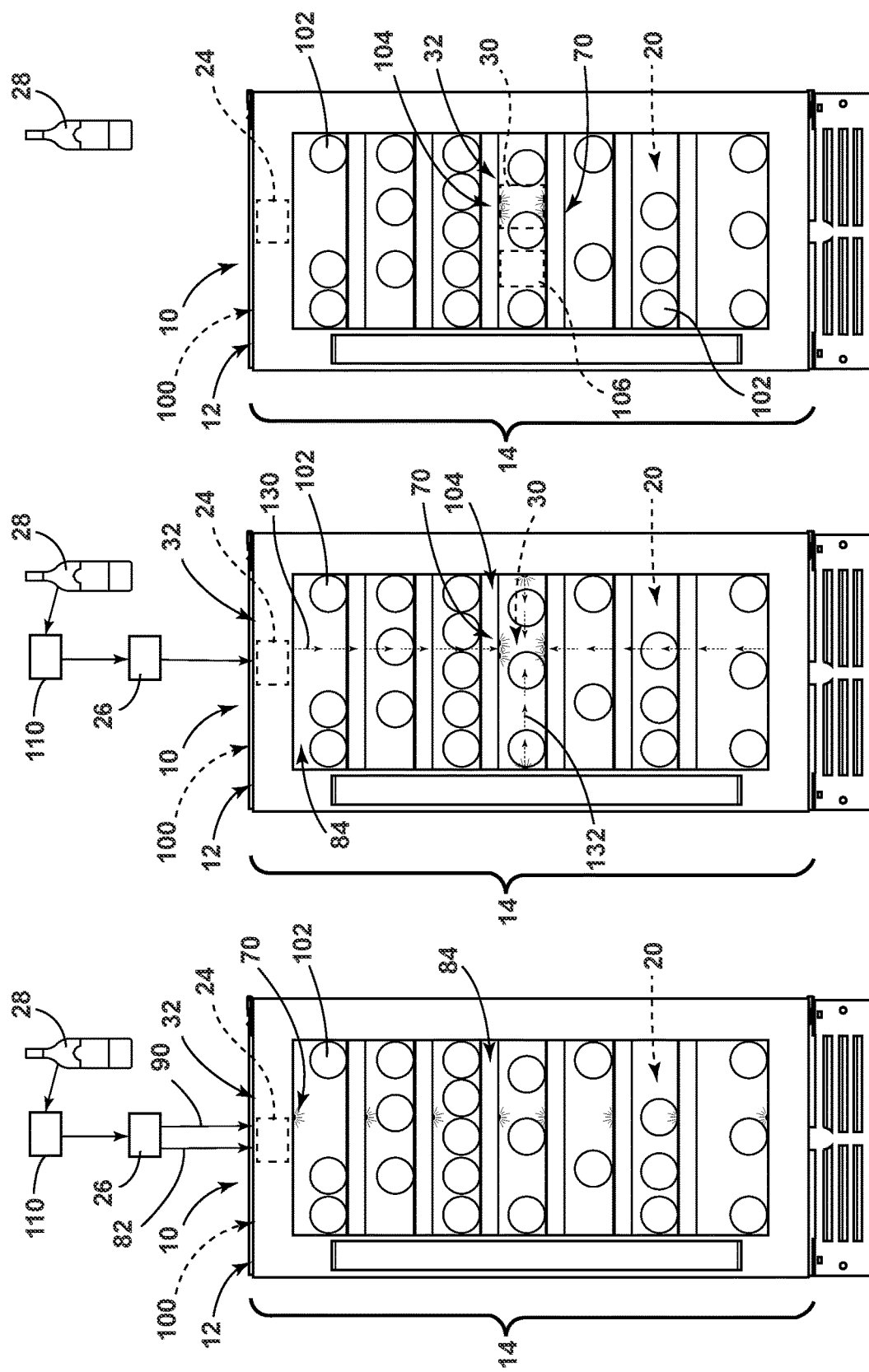

INVENTORY INDICATION MECHANISM UTILIZING VISUAL INDICIA

The present application is a continuation of U.S. patent application Ser. No. 17/391,257 filed Aug. 2, 2021, now U.S. Pat. No. 11,703,274, which is a continuation of U.S. patent application Ser. No. 16/176,192 filed Oct. 31, 2018, now U.S. Pat. No. 11,112,168, both of which are entitled INVENTORY INDICATION MECHANISM UTILIZING VISUAL INDICIA, the entire disclosure of which is hereby incorporated herein by reference.

FIELD OF THE DEVICE

The device is in the field of refrigerating appliances, and more specifically, a mechanism for providing status information regarding an interior cavity of the appliance as well as inventory information as to the contents of the appliance.

SUMMARY

In at least one aspect, a refrigerating appliance includes a cabinet that defines an interior cavity. A temperature sensing network monitors a temperature stratification of the interior cavity. The temperature stratification includes a plurality of temperature levels that correspond to respective locations of the interior cavity. A controller is configured to receive an input related to an item to be stored. The controller is further configured to compare the input with the temperature stratification. The controller is further configured to identify a primary storage location of the item to be stored based upon a comparison of the input and the plurality of temperature levels of the temperature stratification. A visual indicia is disposed within the interior cavity and coupled to the controller. The visual indicia activates to identify the primary storage location of the item to be stored.

In at least another aspect, a method of storing consumable items in a refrigerating appliance includes providing an input related to an item to be stored within a refrigerating cavity, comparing the input with a temperature stratification of the refrigerating cavity, determining a primary storage location within the refrigerated cavity based upon comparison of the input and the temperature stratification and activating a visual indicia highlighting the primary storage location within the refrigerating interior.

In at least another aspect, a refrigerating appliance includes a cabinet that defines a refrigerating cavity. A temperature sensing network maintains a temperature stratification of the refrigerating cavity. The temperature stratification includes a plurality of different temperatures. A humidification system cooperates with the temperature sensing network to maintain a substantially consistent relative humidity throughout the temperature stratification of the refrigerating cavity. A controller is configured to receive an input related to an item to be stored. The controller is further configured to compare the input with the temperature stratification to identify a primary storage location of the item to be stored within the temperature stratification. A lighting system, in response to the input, selectively performs a predetermined lighting sequence based upon a location of the primary storage location within the refrigerating cavity.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIGS. 5-7 are front elevational views of the appliance of FIG. 1 showing a visual indicia progression for identifying a specific portion of the refrigerating appliance;

DETAILED DESCRIPTION OF EMBODIMENTS

Figure 1:
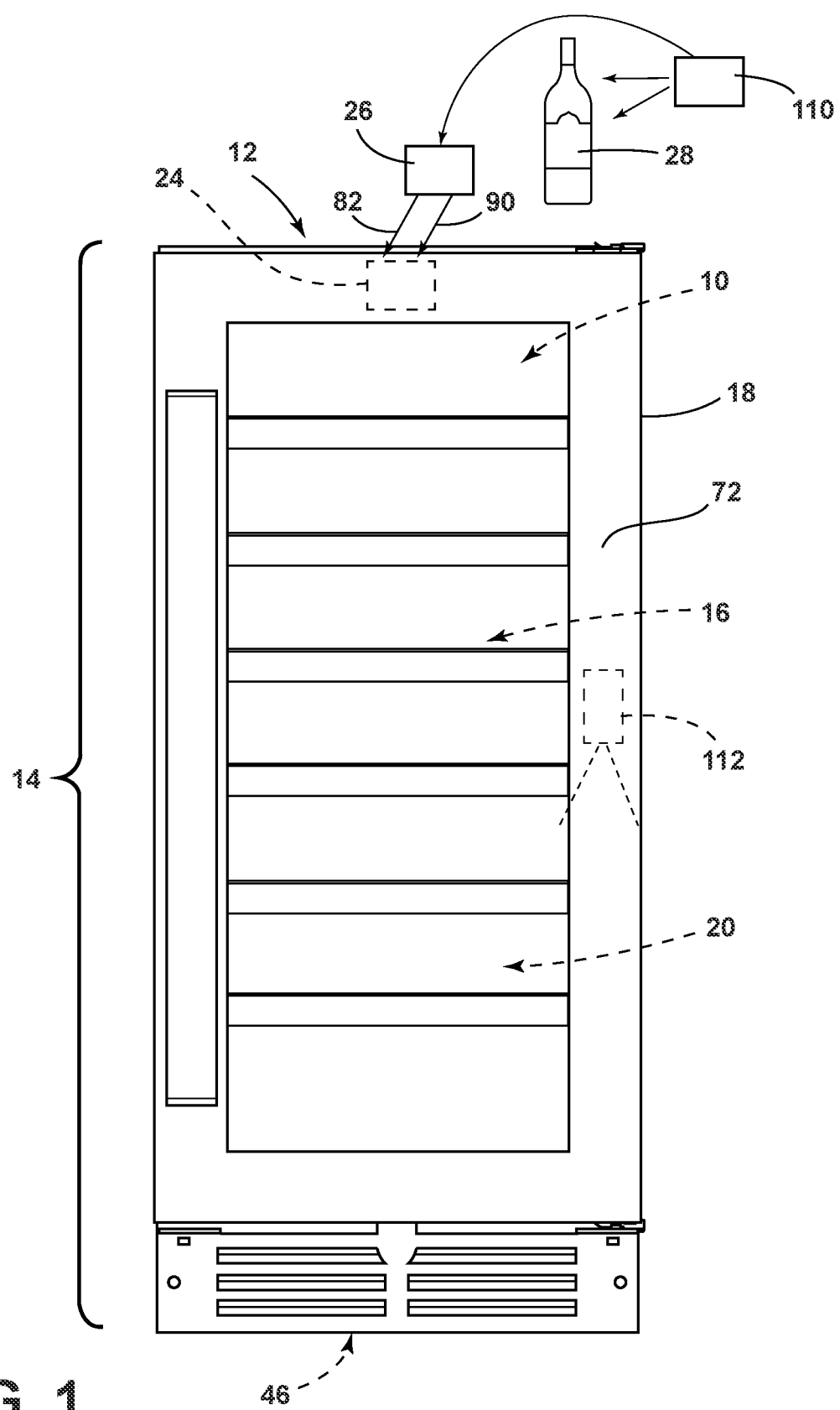
FIG. 1 is a front elevational view of an appliance incorporating an aspect of the status indication mechanism.
Figure 2:
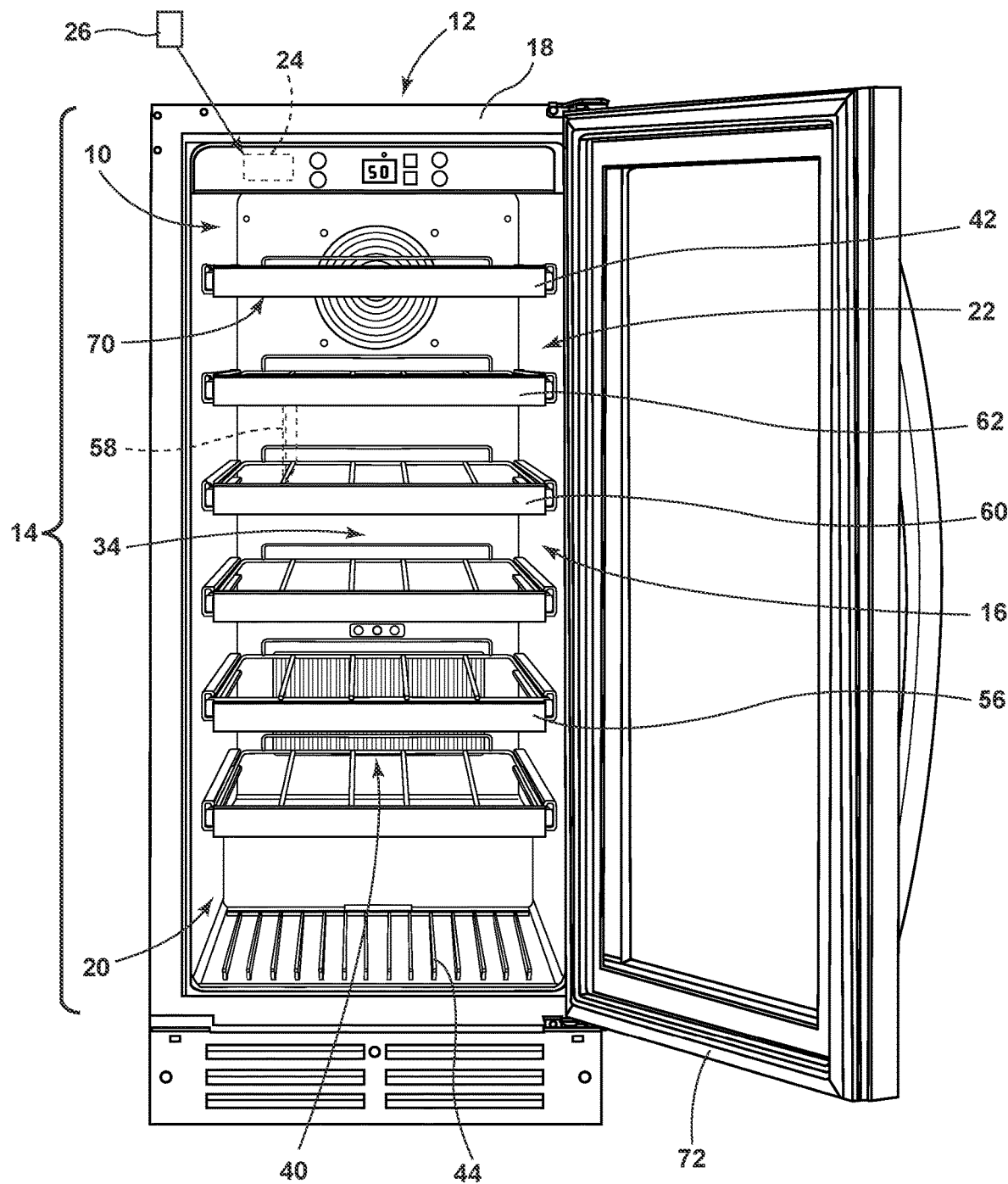
FIG. 2 is a front perspective view of an appliance with a door in an open position and showing an interior compartment that includes an aspect of the status indication mechanism.
Figure 3:
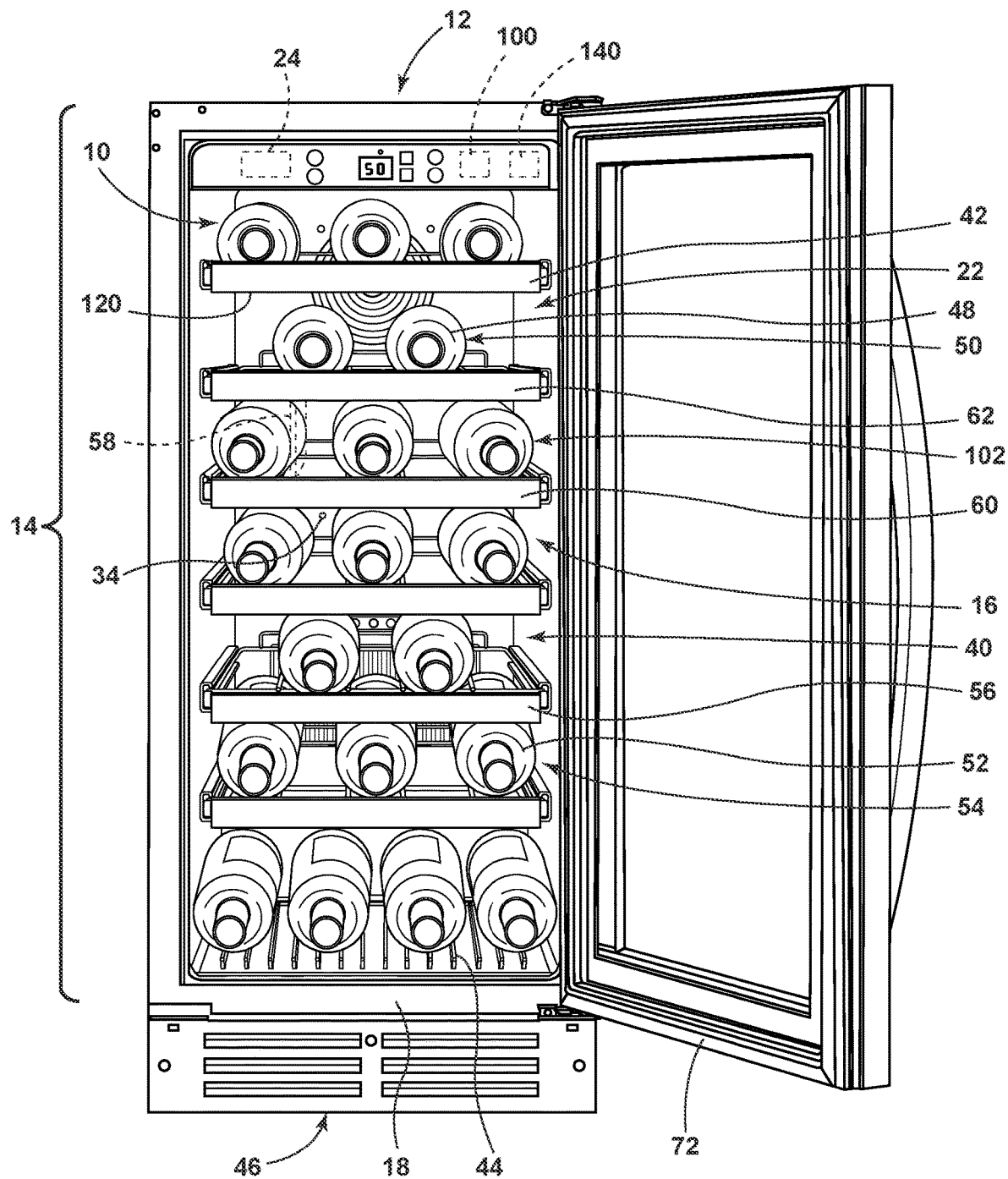
FIG. 3 is a front perspective view of the appliance of FIG. 2 and showing various inventory items disposed within the interior compartment of the appliance.
Figure 4:
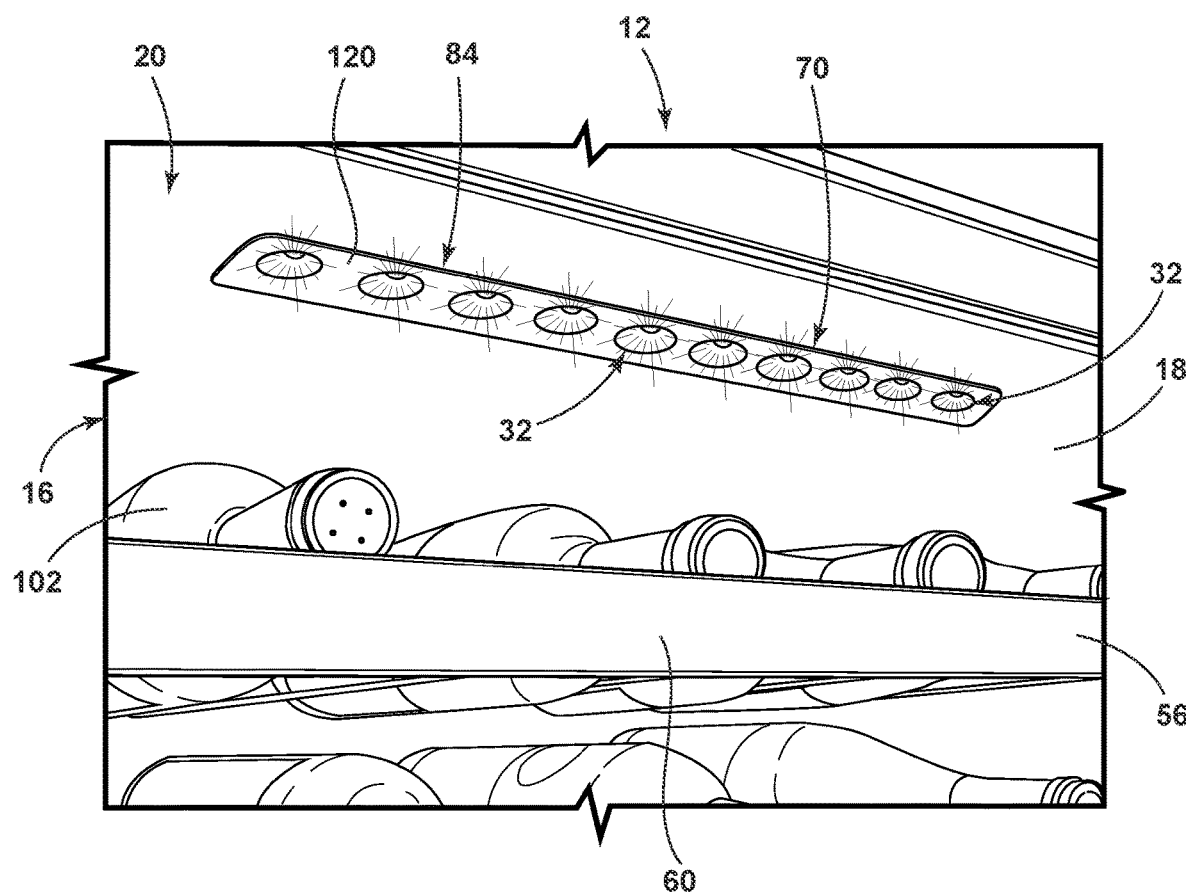
FIG. 4 is a detailed perspective view of the appliance of FIG. 3 showing an aspect of the visual indicia used in conjunction with an aspect of the status indication mechanism.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIGS. 1-8 and 12, reference numeral 10 generally refers to a temperature sensing network that is incorporated within an appliance 12, typically a refrigerating appliance 12 that can be used within various residential and commercial settings. The temperature sensing network 10 is configured to sense, monitor, regulate, and otherwise maintain a temperature stratification 14 within a refrigerating compartment 16 of the appliance 12. According to various aspects of the device, the appliance 12 includes a cabinet 18 that defines an interior cavity 20 for holding various inventory items 28 that may be consumable products. The temperature sensing network 10 is in communication with the cabinet 18 and monitors a temperature stratification 14 of the interior cavity 20. The temperature stratification 14 includes a plurality of temperature or refrigerating levels 22 that correspond to respective locations of the interior cavity 20. A controller 24 is configured to receive an input 26 related to an inventory item 28 to be stored within the interior cavity 20. The controller 24 is further configured to compare the input 26 related to the inventory item 28 related to the temperature stratification 14. The controller 24 is also configured to identify a primary or preferred storage location 30 of the inventory item 28 to be stored based upon a comparison of the input 26 and the plurality of refrigerating levels 22 of the temperature stratification 14. A visual indicia 32 that is at least partially disposed within the interior cavity 20 of the cabinet 18, and which is coupled to the controller 24, activates to identify the preferred storage location 30 of the inventory item 28 to be stored. In this manner, the visual indicia 32 communicates information to the user related to the preferred storage location 30 of the inventory item 28 to be stored.

The temperature stratification 14 that is monitored and maintained by temperature sensors 34 of the temperature sensing network 10 can include various portions of the interior cavity 20 that include different temperature regions 40 that define a plurality of refrigerating levels 22. By way of example, and not limitation, a top shelf 42 of the interior cavity 20 may have a warmer temperature level and a portion of the interior cavity 20 toward the bottom shelf 44 of the interior cavity 20 may have a cooler temperature level, or vice versa. These individual temperature or refrigerating levels 22 within the temperature stratification 14 can be maintained by the temperature sensing network 10 that is placed in communication with the refrigerating system 46 for the appliance 12.

The temperature stratification 14 can be incorporated within the refrigerating appliance 12, such as a wine refrigerator, where it is recommended that different bottles of wine be stored at different temperatures, in relation to one another. Accordingly, a first bottle of wine 48 that is to be stored at a warmer temperature, may have a first preferred storage location 30 while a second bottle of wine 52 that is to be kept at a different storage temperature can have a second preferred storage location 54 within the same interior cavity 20, but at a different refrigerating level 22 of the temperature stratification 14. The temperature stratification 14 for the interior cavity 20, according to various aspects of the device, can correspond to different shelves 60 disposed within the interior cavity 20. These horizontal dividers 56, in the form of shelves 60, can be used to at least partially define the different refrigerating levels 22 for the appliance 12. It also contemplated that vertical dividers 58 can also be incorporated within the appliance 12 to define separate refrigerating levels 22 within the temperature stratification 14 that may be separately defined within a single shelf 60.

Referring again to FIGS. 1-8, the visual indicia 32 can include a plurality of lights 70 that are selectively activated and/or deactivated to highlight the preferred storage location 30. The plurality of lights 70 can be activated in a sequential pattern, animation, or other visual indicia 32 that draws the attention of the user to the preferred storage location 30 of a particular inventory item 28 to be stored within the interior cavity 20. As exemplified in FIGS. 5-7, a series of lights 70 disposed within the interior cavity 20, within a door 72, or within the various shelves 60 can be activated to form a vertical and/or horizontal visual pattern 84 that directs the user's eye toward a specific location within one shelf 60 of the plurality of shelves 60 and within temperature stratification 14.

In operation, as exemplified in FIGS. 1-8, a user may desire to store a particular bottled alcoholic beverage, such as a bottle of wine 80, within the interior cavity 20. An input 26 related to the inventory item 28, such as the bottled wine, can be delivered to the temperature sensing network 10 and/or the controller 24. This input 26 can be compared with a database or other catalogue of information related to the preferred storage temperature 82 of various inventory items 28 that may be stored within the interior cavity 20. In the instance of a refrigerated wine rack, various bottles of wine 80 can include a memory that includes various status information regarding inventory items 28 and can include a recommended storage temperature range for the various bottles of wine 80 that may be stored within the interior cavity 20. The input 26 related to the inventory item 28 to be stored is compared with this catalogue of temperature information that may be stored within the memory for the appliance 12. This comparison is used to derive a preferred storage temperature 82 for the inventory item 28 to be stored. This preferred storage temperature 82 is then compared with the temperature stratification 14 for the interior cavity 20 of the appliance 12 to arrive at the preferred storage location 30 within the temperature stratification 14. The controller 24 then activates the visual indicia 32 to identify the preferred storage location 30 within the temperature stratification 14 of the interior cavity 20. Through this mechanism, the user, after providing the input 26, observes a visual animation or visual pattern 84 of the visual indicia 32 that leads the user's attention to a particular preferred storage location 30 within the interior cavity 20 for placing the inventory item 28 to be stored.

Referring again to FIGS. 3-8, in certain instances, a particular inventory item 28 to be stored can have an optimal range 90 of preferred storage temperatures 82 with which the inventory item 28 can be stored. This optimal range 90 may be present within multiple portions of the temperature stratification 14. In such an instance, there may be multiple preferred storage locations 30 for the particular inventory item 28 to be stored. There may also be multiple potential preferred storage locations 30 within a single refrigerating level 22 of the temperature stratification 14. In each of these instances, the visual indicia 32 may highlight more than one location of the interior cavity 20 within which the inventory item 28 can be stored.

In various aspects of the device, as exemplified in FIGS. 3-7, the appliance 12 can also include an inventory assessment module 100 that is in communication with the controller 24. In such an embodiment, the inventory assessment module 100 can monitor a current inventory 102 of the interior cavity 20. Upon receipt of the input 26 related to the inventory item 28 to be stored, the controller 24 cooperates with the inventory assessment module 100 and the temperature sensing network 10 to determine a corresponding preferred storage location 30 for the item to be stored. In this instance, the preferred storage location 30 can take into account the input 26, the temperature stratification 14, stored items within the current inventory 102 and the optimal range 90 of preferred storage temperatures 82 for the particular inventory item 28 to be stored. Using this information, the controller 24 is configured to present a recommendation 104 to the user for locating the inventory item 28 to be stored. This recommendation 104 can include information communicated via the visual indicia 32 related to the preferred storage location 30 of the inventory item 28 to be stored. This recommendation 104 can also include a secondary storage location 106 that may have a refrigerating level 22 that is near the outer limits of the optimal range 90 of preferred storage temperatures 82 for the inventory item 28 to be stored. In such an embodiment, the primary preferred storage location 30 may be fully occupied by other items of the current inventory 102 stored within the interior cavity 20 of the appliance 12. In this situation, the secondary storage location 106 can be located within the temperature stratification 14 and having a refrigerating level 22 that is within the optimal range 90 of preferred storage temperatures 82, but potentially defining an outer portion of this optimal range 90 of preferred storage temperatures 82 for the particular inventory item 28 to be stored.

Within various aspects of the device, as exemplified in FIGS. 1-8, the inventory assessment module 100 can also store information concerning the current inventory 102 of the interior cavity 20. This current information can include the optimal range 90 of preferred storage temperatures 82 for each respective item of the current inventory 102 stored within the appliance 12. Where a particular refrigerating level 22 of the temperature stratification 14 is fully occupied by items of the current inventory 102, the recommendation 104 provided by the controller 24, utilizing the inventory assessment module 100, can include a recommendation 104 for relocating one or more items of the current inventory 102 to a separate location in order to accommodate the storage of the new inventory item 28 to be stored within the refrigerating appliance 12. In this manner, the inventory assessment module 100 takes into account the optimal range 90 of temperatures for each item of the current inventory 102 as well as the location of each item of the current inventory 102 within the temperature stratification 14.

In various aspects of the device, as exemplified in FIGS. 1-8 and 12, the inventory assessment module 100 can operate in conjunction with the controller 24 and the refrigerating system 46 for the appliance 12 to modify the size of a particular refrigerating level 22 to allow for additional storage space within that refrigerating level 22. By way of example, and not limitation, where a particular refrigerating level 22 occupies a single shelf 60 within the interior cavity 20, the inventory assessment module 100 in conjunction with the controller 24 and the refrigerating appliance 12 can expand that refrigerating level 22 to also occupy an adjacent shelf 62 or a different shelf 60 within the interior cavity 20 that may be empty or may have items of the current inventory 102 that can be stored within the refrigerating level 22 that is to be increased in size.

To accomplish the various modulations in temperature for the various refrigerating levels 22 of the temperature stratification 14, the refrigerating system 46 for the appliance 12 can include a plurality of vents, ducts, and other air delivery mechanisms for providing cool air to a specific location within the interior cavity 20. Using the refrigerating system 46 in connection with the controller 24, the inventory assessment module 100, the temperature sensing network 10, and various temperature sensors 34 located within the interior cavity 20, the temperature stratification 14 can be maintained in a set configuration or can be modulated to account for additional inventory items 28 to be stored within the temperature stratification 14. In such an embodiment, the plurality of refrigerating levels 22 of the temperature stratification 14 are selectively adjustable based on the input 26 related to the inventory item 28 to be stored and an availability of preferred storage locations 30. Where the availability of preferred storage locations 30 is limited, the temperature stratification 14 can be selectively adjustable to adjust or otherwise modulate the size of the preferred storage location 30. By increasing the size of one refrigerating level 22, it is necessary that the size of a different refrigerating level 22 be decreased. Such decrease by the refrigerating system 46 is performed in conjunction with the inventory assessment module 100 to ensure that changes in the temperature stratification 14 do not adversely affect the items of the current inventory 102 stored within the refrigerating appliance 12.

The input 26 related to the inventory item 28 to be stored can be delivered to the appliance 12 utilizing a portable computing device 110 such as a cell phone, tablet, lap top, hand held scanner, or other similar device external to the appliance 12. It is also contemplated that the appliance 12 can include an integral scanner 112 (shown in FIG. 1) that can be used for delivering the input 26 to the controller 24. Where an external portable computing device 110 is utilized for delivering input 26, the portable computing device 110 can include a memory that includes the various optimal range 90 of preferred storage temperatures 82 for the particular inventory items 28 to be stored as well as the types of inventory items 28 that may be stored within the interior cavity 20 of the appliance 12. In such an embodiment, where the portable computing device 110 delivers the input 26, this input 26 can also include the optimal range 90 of storage temperatures related to the particular inventory item 28 to be stored.

Figure 9:
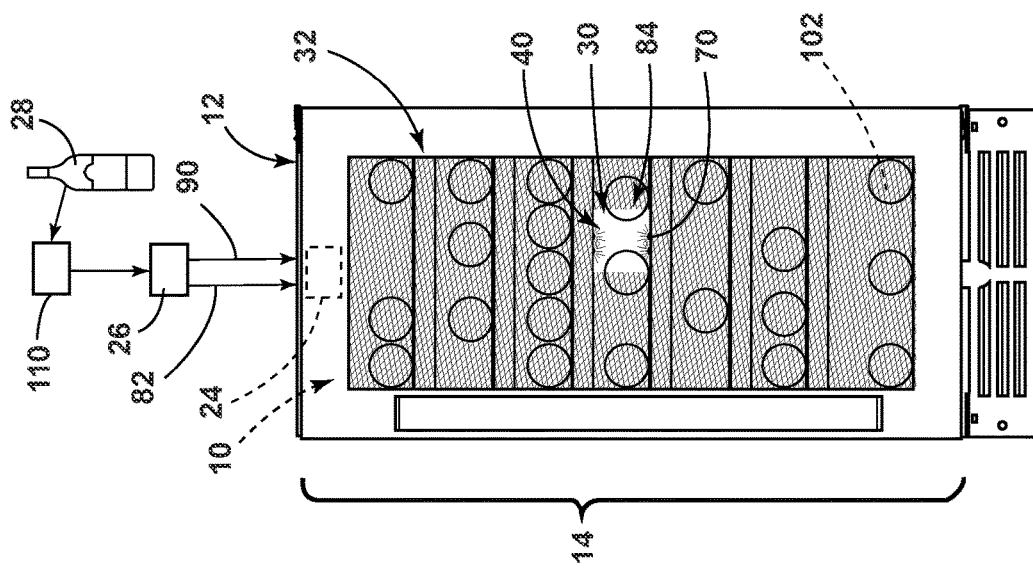
FIG. 9 is a front elevational view of the appliance of FIG. 1 showing an alternate aspect of the status indication mechanism.
Figure 11:
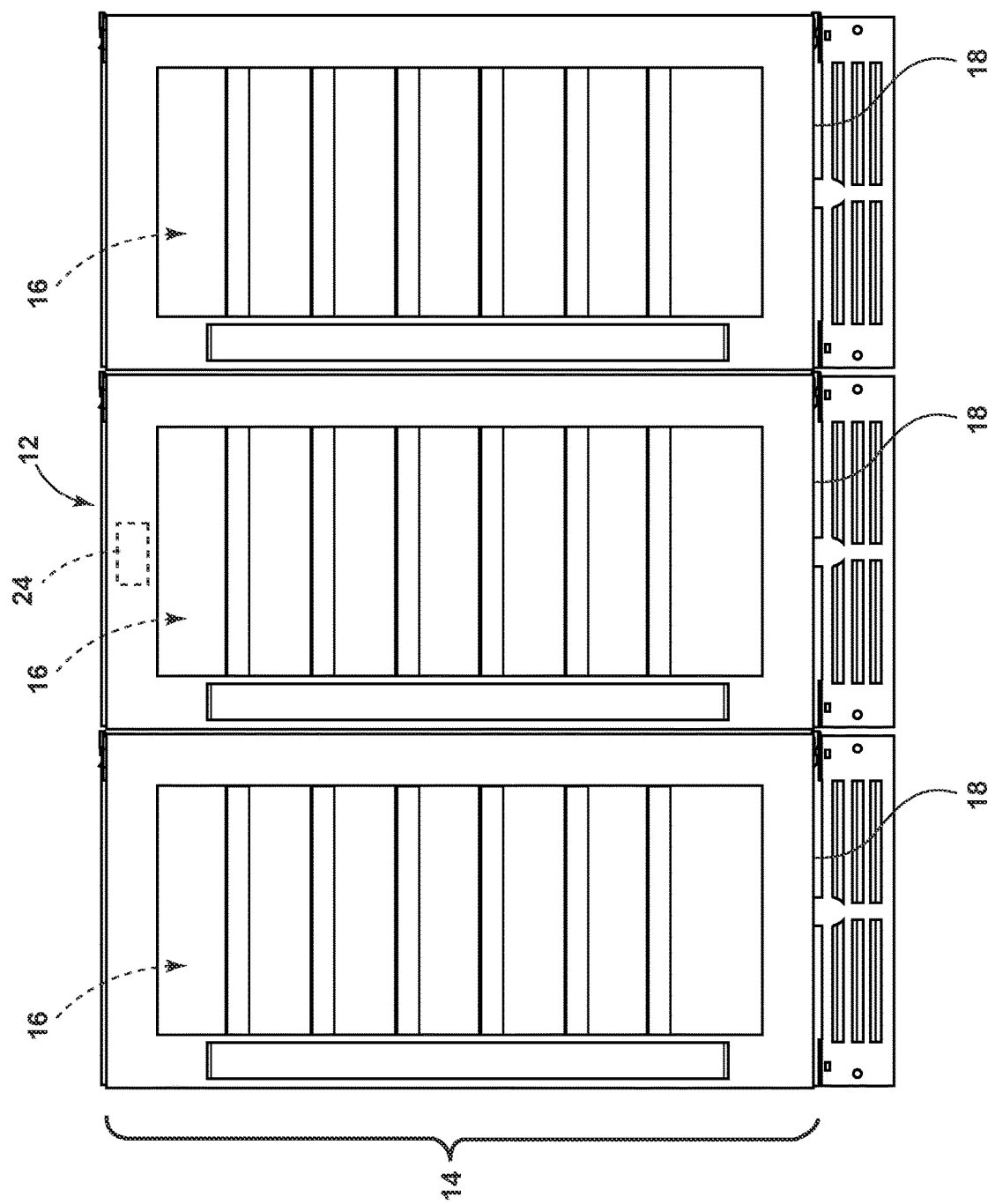
FIG. 11 is a front elevational view of a multi-compartment appliance that incorporates an aspect of the status indication mechanism.
Figure 12:
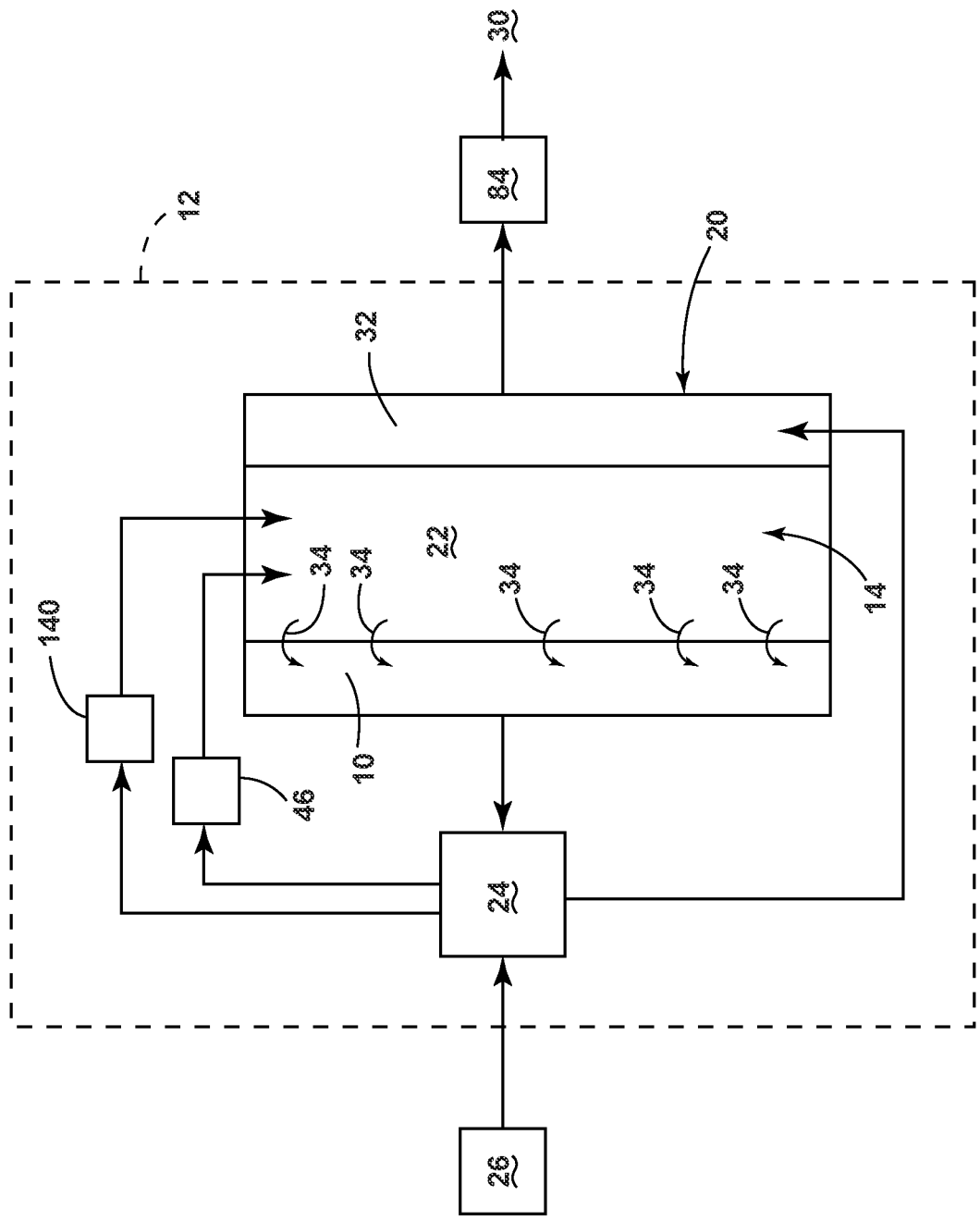
FIG. 12 is a schematic diagram illustrating an exemplary operation of various systems of the appliance upon receipt of an input.
Figure 13:
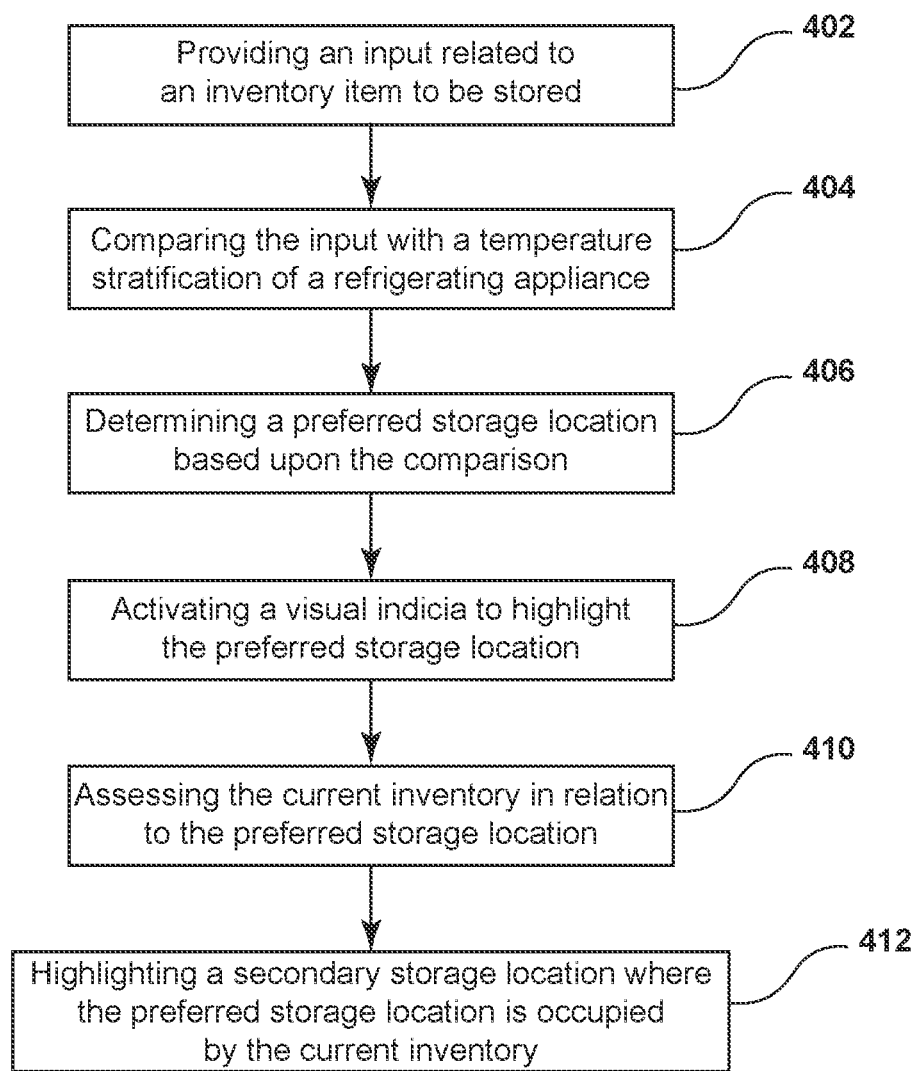
FIG. 13 is a linear flow diagram illustrating a method for storing inventory items within an appliance utilizing an aspect of the status indication mechanism.

The visual indicia 32 related to the preferred storage location 30 of the inventory item 28 to be stored can include various light fixtures 120 that are spaced throughout the interior cavity 20 and the appliance 12 in general. The visual indicia 32 for the appliance 12 can utilize various visual patterns 84 for highlighting the preferred storage location 30, the secondary storage location 106 or other recommendation 104 to be provided to the user. These visual patterns 84 can include a pattern of activation and deactivation of the various light fixtures 120 to draw the user's attention to a particular location, as exemplified in FIGS. 5-7. These patterns can also include activating certain lights 70 in a particular area and deactivating, dimming or at least partially darkening lights 70 in all other areas so that a single area or set of areas become highlighted while other areas of the interior cavity 20 become at least partially darkened and more visually muted, as exemplified in FIG. 9.

Referring now to FIGS. 5-7, in one exemplary aspect of the device, the visual indicia 32 can include a sequential activation and deactivation of various light fixtures 120 of the visual indicia 32 for identifying the preferred storage location 30 of the inventory item 28 to be stored. In the illustrated aspect, a column of lights 130 and a row of lights 132, as exemplified in FIG. 5, can be activated to provide a vertical and horizontal highlighting pattern of the light fixtures 120 of the visual indicia 32 to the user. As exemplified in FIG. 6, these light fixtures 120 can be sequentially activated and deactivated to give the impression of movement, in vertical and horizontal directions, toward the preferred storage location 30. As exemplified in FIG. 7, after a series of sequentially patterned light activations and deactivations, light fixtures 120 surrounding the preferred storage location 30 can remain highlighted for a predefined period of time to further highlight the preferred storage location 30 of the inventory item 28 to be stored.

Figure 8:
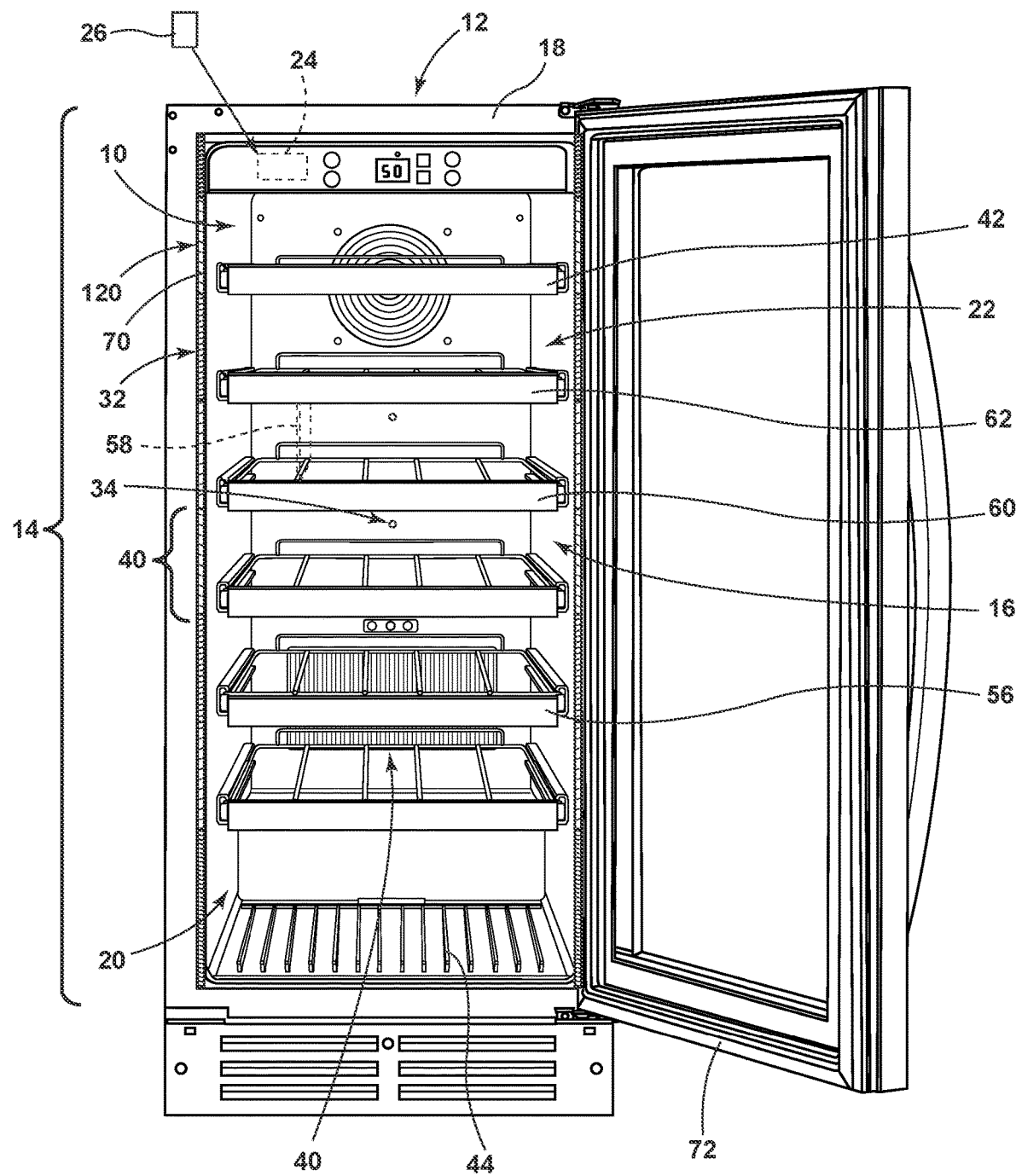
FIG. 8 is a front elevational view of the appliance of FIG. 2 showing an aspect of the status indication mechanism that incorporates a temperature sensing network.
Figure 10:
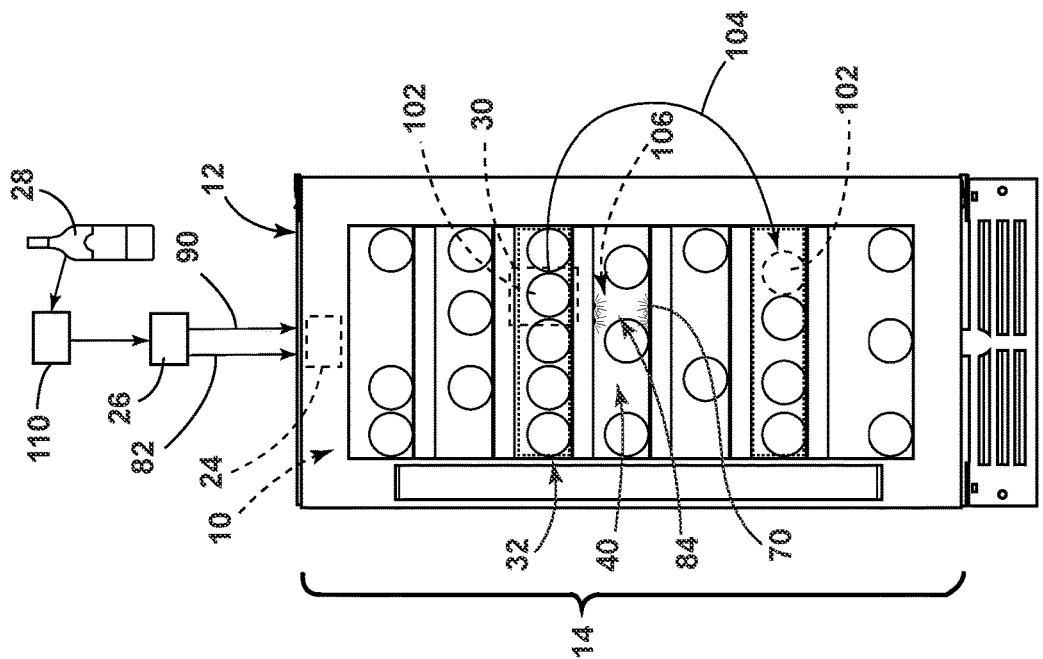
FIG. 10 is a front elevational view of the appliance of FIG. 1 showing an aspect of the status indication mechanism.

As exemplified in FIG. 8, the visual indicia 32 can also reflect information regarding the temperature stratification 14 for the interior cavity 20. In such an aspect of the device, a series of light fixtures 120 can be included within and/or surround a portion of the interior cavity 20 for the appliance 12. These light fixtures 120 surrounding the interior cavity 20 can be color-coded to reflect various temperature or refrigerating levels 22 within the temperature stratification 14. By way of example, and not limitation, light fixtures 120 of the visual indicia 32 that emit "warmer" colors such as red, orange, or other similar colors can be indicative of a higher temperature refrigerating level 22 of the temperature stratification 14. Conversely, light fixtures 120 having "cooler" colors such as purple, blue, and certain greens can be used to reflect temperatures of the refrigerating level 22 of the temperature stratification 14 that are cooler or lower in temperature. These various color-coded signals of the visual indicia 32 can correspond to different refrigerating levels 22 of the temperature stratification 14. These portions of the visual indicia 32 can also be used to identify the preferred storage location 30 corresponding to the appropriate refrigerating level 22 within the temperature stratification 14 for storing the inventory item 28 to be stored.

Referring again to FIGS. 1-8 and 12, because the temperature stratification 14 of the interior compartment may contain a plurality of temperature levels having varying temperatures, the appliance 12 can also include a humidity regulating system 140. In the case of bottles of wine, consistent humidity level within a storage area is a preferred characteristic of the appliance 12. Additionally, different temperatures may naturally reflect different humidity levels such that a refrigerating level 22 of the temperature stratification 14 having a cooler temperature may be naturally less humid than a warmer area of the temperature stratification 14. In such an instance, the humidity regulating system 140 can be used to input various levels of moisture within the refrigerating levels 22 of the temperature stratification 14 to maintain substantially consistent preferred humidity level within each location of the respective locations of the interior cavity 20. Accordingly, the humidity regulating system 140 can add moisture to various areas and remove moisture from other areas to maintain the preferred humidity level within each of the refrigerating levels 22 of the temperature stratification 14 within the interior cavity 20.

In the various aspects of the device, the temperature sensing network 10 that monitors the temperature stratification 14 as well as the humidity regulating system 140 for the appliance 12 are used in conjunction to provide substantially precise control of the environment within the interior cavity 20 for the appliance 12. Such finite control is preferred when storing various inventory items 28 that can include, but are not limited to, bottles of wine, cigars, and other similar collectible consumable items that may also serve as an investment. While the appliance 12 described herein is primarily used for food and other consumable products, the precise climate control capabilities of the appliance 12 described herein can also be used for other collectible items that can include, but are not limited to, stamps, rare books, documents, items that are sensitive to humidity and other similar items. The appliance 12 utilizing the temperature sensing network 10 can also be used for more ordinary or typical household storage for items of produce, cheese, and other similar consumable inventory items 28.

Referring now to FIGS. 1-12, it is contemplated that the appliance 12 that utilizes the temperature sensing network 10 for monitoring and maintaining the temperature stratification 14 can include multiple individual cabinets 18 that can be attached to one another and placed in communication with a single controller 24 or multiple cooperative controllers 24. In such an embodiment, multiple cabinets 18 can be cooperatively placed in communication to receive a single input 26 and provide a preferred storage location 30 among the several cabinets 18. In such an embodiment, the multiple cabinets 18 essentially form a single appliance 12 that include multiple interior cavities, each having its own respective temperature stratification 14 of refrigerating levels 22. It is contemplated that in extensive wine cellars, several individual appliances 12 can be cooperatively placed in communication for the storage of collections of bottles of wine and other items. By way of example, and not limitation, restaurants, collectors, wineries, vineyards, distilleries, and large private collectors can utilize multiple appliances 12 that each include an aspect of the temperature sensing network 10. The various temperature sensing networks 10 of each appliance 12 can be cooperatively placed in communication such the multiple individual appliances 12 cooperate to define a single appliance 12 that can be utilized by the user when a single input 26 is delivered to a controller 24. The single input 26 can be used to compare against the various temperature stratification 14 of each individual appliance 12 for providing the user with a single recommendation 104 with respect to the preferred storage location 30 or multiple recommendations 104.

Referring again to FIGS. 1-12, the refrigerating appliance 12 includes the cabinet 18 that defines a refrigerating interior cavity 20. The temperature sensing network 10 maintains the temperature stratification 14 of the refrigerating interior cavity 20. The temperature stratification 14 includes a plurality of different temperatures that correspond to the various refrigerating levels 22 of the temperature stratification 14. The humidification system, typically in the form of a humidity regulating system 140, cooperates with the temperature sensing network 10 to maintain a substantially consistent relative humidity throughout the temperature stratification 14 of the refrigerating interior cavity 20. A controller 24 is configured to receive an input 26 relative to an inventory item 28 to be stored. The controller 24 is configured to compare the input 26 with the temperature stratification 14 to identify a preferred storage location 30 of the inventory item 28 to be stored within the temperature stratification 14. The visual indicia 32 that includes a lighting system of light fixtures 120 operates in response to the input 26. This lighting system of the visual indicia 32 selectively performs a predetermined lighting sequence or visual pattern 84 based upon the location of the preferred storage location 30 within the refrigerating interior cavity 20. As discussed above, the temperature stratification 14 includes a plurality of refrigerating levels 22 that are selectively adjustable based upon the input 26 and an availability of the preferred storage location 30 within the refrigerated interior cavity 20. The temperature stratification 14 is selectively adjustable to adjust the size of the various refrigerating levels 22 and also adjust the number of preferred storage locations 30 within a particular refrigerating level 22 and within the temperature stratification 14.

Referring now to FIGS. 1-13, having described various aspects of the temperature sensing network 10, a method 400 is disclosed for storing consumable items within a refrigerating appliance 12 utilizing an aspect of the temperature sensing network 10. According to the method 400, step 402 includes providing an input 26 related to an inventory item 28 to be stored within a refrigerating interior cavity 20. After the input 26 is received, the input 26, which may include a preferred storage temperature 82, is compared with a temperature stratification 14 of the refrigerating cavity (step 404). A preferred storage location 30 within the refrigerating interior cavity 20 is determined by the controller 24 based upon the comparison of the input 26 and the temperature stratification 14 (step 406). After the preferred storage location 30 is determined, the visual indicia 32 activates to highlight the preferred storage location 30 within the refrigerating interior cavity 20 (step 408). As discussed above, the method 400 can be utilized for storing various collectible items that require climate control. These items can include, but are not limited to, bottles of wine, cigars, and other similar consumable investment items. The visual indicia 32 typically includes a plurality of light fixtures 120 that selectively activate and deactivate to highlight the preferred storage location 30 within the interior cavity 20. The visual indicia 32 can also be supplemented with various auditory or tactile indicia that can be used to further highlight the preferred storage location 30 within the interior cavity 20. Additionally, the various lights 70 of the visual indicia 32 can be activated and deactivated in a predefined sequential operation to perform an "animation" using the plurality of lights 70 of the visual indicia 32. This "animation" can be used to direct the user's attention to the preferred storage location 30 for identification purposes.

According to the method 400, the appliance 12 can include the inventory assessment module 100. Where included, the method 400 can include a step of assessing the current inventory 102 of stored items within the refrigerated interior cavity 20 in relation to the preferred storage location 30 (step 410). Once the current inventory 102 is assessed, the visual indicia 32 can be activated to highlight a secondary storage location 106 when the primary and preferred storage location 30 is occupied by item of the current inventory 102 (step 412). This secondary storage location 106 can be based upon the input 26 and the temperature stratification 14. As discussed above, each item of inventory can include an optimal range 90 of preferred storage temperatures 82. This secondary storage location 106 can be within the temperature stratification 14 at a temperature that is within this optimal range 90 of preferred storage temperatures 82 for the particular inventory item 28 to be stored. As discussed above, the controller 24 for the appliance 12 can also activate a refrigerating system 46 to modify a particular refrigerating level 22 within the temperature stratification 14. In such an aspect of the device, the refrigerating system 46 operates to increase the size of a particular refrigerating level 22 to add the number of preferred storage locations 30 within the refrigerating level 22. In this manner, a modified preferred storage location 30 can be generated by cooling or warming a particular location within the refrigerating interior cavity 20 for the appliance 12. This modified preferred storage location 30 can be utilized when the preferred storage location 30 for an inventory item 28 to be stored is fully occupied by the current inventory 102. As discussed above, the appliance 12 can also utilize the controller 24 and the inventory assessment module 100 to provide recommendations 104 concerning relocation of the various items of the current inventory 102 within the interior cavity 20. Movement of the current inventory 102 can be based on the optimal range 90 of preferred storage temperatures 82 for each item of the current inventory 102 as well as the optimal range 90 of preferred storage temperatures 82 for the item to be stored. The controller 24 compares this information to ensure each item of the current inventory 102 and the inventory item 28 to be stored can be placed within a respective preferred storage location 30 within the interior cavity 20 of the appliance 12.

According to various aspects of the device, the appliance 12 that includes the temperature sensing network 10 can include various appliances 12 that can include, but are not limited to, refrigerators, freezers, coolers, humidors, climate controlled storage cabinets 18 and other similar climate controlled fixtures.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A refrigerating appliance comprising:
    a plurality of cabinets that define a plurality of respective interior cavities, wherein the plurality of respective interior cavities includes corresponding temperature stratifications;
    a temperature sensing network that monitors the corresponding temperature stratifications of the plurality of respective interior cavities;
    a controller that is configured to receive an input related to an item to be stored, wherein the controller is further configured to compare the input with the corresponding temperature stratifications, the corresponding temperature stratifications relating to respective vertical and lateral locations within the plurality of respective interior cavities, collectively, and wherein the controller is further configured to identify a primary storage location of the item to be stored based upon a comparison of the input and a plurality of temperature levels of the corresponding temperature stratifications;
    a temperature control system in communication with the plurality of respective interior cavities that is selectively operable to provide conditioned air to specific locations of the respective vertical and lateral locations, wherein the respective vertical and lateral locations of the corresponding temperature stratifications are selectively adjustable using the temperature control system to adjust a size of the primary storage location within a continuous interior cavity of the plurality of respective interior cavities, wherein the respective vertical and lateral locations are defined by a plurality of shelves; and
    a visual indicia disposed within the continuous interior cavity that identifies the primary storage location of the item to be stored.

2. The refrigerating appliance of claim 1, wherein the temperature control system includes a plurality of respective refrigerating systems that correspond to the plurality of cabinets and the plurality of respective interior cavities.

3. The refrigerating appliance of claim 1, wherein at least one vertical divider extends between vertically adjacent shelves of the plurality of shelves to define the corresponding temperature stratifications with respect to the respective vertical and lateral locations of the plurality of respective interior cavities.

4. The refrigerating appliance of claim 1, wherein the visual indicia includes a plurality of lights, and wherein at least one light of the plurality of lights selectively activates to highlight the primary storage location.

5. The refrigerating appliance of claim 4, wherein the visual indicia selectively highlights the primary storage location by at least partially darkening areas of the plurality of respective interior cavities adjacent to the primary storage location.

6. The refrigerating appliance of claim 1, wherein at least a portion of the plurality of respective interior cavities defines the continuous interior cavity that extends from a base to a top portion of the respective cabinet of the plurality of cabinets.

7. The refrigerating appliance of claim 4, wherein the plurality of respective interior cavities are defined by the visual indicia that selectively highlights the primary storage location by performing an animation using the plurality of lights, wherein the animation is directed to the primary storage location.

8. The refrigerating appliance of claim 4, wherein the plurality of lights identify the primary storage location and also identify at least a secondary storage location by at least partially darkening areas of the plurality of respective interior cavities adjacent to the primary storage location.

9. The refrigerating appliance of claim 1, wherein the temperature control system includes a humidity regulator, wherein the humidity regulator cooperates with the controller to maintain a substantially consistent preferred humidity level within each location of the respective vertical and lateral locations of the plurality of respective interior cavities.

10. The refrigerating appliance of claim 2, wherein the temperature control system includes a plurality of vents that are in communication with the plurality of respective refrigerating systems that deliver the conditioned air to the respective vertical and lateral locations of the plurality of respective interior cavities.

11. The refrigerating appliance of claim 3, wherein each of the plurality of shelves is configured to include the plurality of temperature levels of the corresponding temperature stratifications, wherein the plurality of temperature levels are at least partiality separated by a vertical divider of the at least one vertical divider.

12. The refrigerating appliance of claim 4, wherein the plurality of lights are at least partially disposed within each shelf of the plurality of shelves.

13. The refrigerating appliance of claim 1, wherein the item to be stored is a bottled alcoholic beverage and the input relates to an optimal range of storage temperatures.

14. The refrigerating appliance of claim 1, further comprising an inventory assessment module in communication with the controller, wherein the inventory assessment module monitors a current inventory of the plurality of respective interior cavities, and wherein upon receipt of the input, the controller cooperates with the inventory assessment module and the temperature sensing network to determine a corresponding primary storage location for the item to be stored and stored items within the current inventory, wherein the controller is configured to present a recommendation to a user for redistributing the current inventory.

15. A method of storing consumable items in a refrigerating appliance, comprising:
    providing an input related to an item to be stored within a refrigerating cavity of a plurality of respective interior cavities;
    comparing the input with corresponding temperature stratifications of the plurality of respective interior cavities, the corresponding temperature stratifications having a plurality of temperature levels that correspond to respective vertical and lateral locations of the plurality of respective interior cavities, wherein the respective vertical and lateral locations are defined by a plurality of shelves;
    determining a primary storage location within the respective vertical and lateral locations of the plurality of respective interior cavities based upon comparison of the input and the corresponding temperature stratifications;
    assessing a current inventory of stored items within the plurality of respective interior cavities in relation to the primary storage location;
    activating a visual indicia highlighting the primary storage location within the respective vertical and lateral locations of the plurality of respective interior cavities; and
    activating a refrigerator for a respective interior cavity of the plurality of respective interior cavities to increase a size of the primary storage location to be a modified primary storage location when the primary storage location is occupied by the current inventory, wherein the modified primary storage location is defined by a portion of the plurality of shelves.

16. The method of claim 15, wherein the respective vertical and lateral locations for determining the primary storage location are further defined by vertical dividers that extends between vertically adjacent shelves of the plurality of shelves.

17. The method of claim 15, wherein the visual indicia includes a plurality of lights that selectively highlight the primary storage location and the modified primary storage location.

18. The method of claim 17, wherein the visual indicia selectively highlights one of the primary storage location and the modified primary storage location by performing an animation using the plurality of lights, wherein the animation is directed to one of the primary storage location and the modified primary storage location.

19. A refrigerating appliance comprising:
  a plurality of cabinets that define a plurality of respective interior cavities;
  a temperature sensing network that maintains corresponding temperature stratifications of the plurality of respective interior cavities, wherein the corresponding temperature stratifications includes a plurality of different temperatures that correspond to respective vertical and lateral locations of the plurality of respective interior cavities;
  a controller configured to receive an input related to an item to be stored, wherein the controller is further configured to compare the input with the corresponding temperature stratifications to identify a primary storage location of the item to be stored within the respective vertical and lateral locations;
  a temperature control system that cooperates with the controller and the temperature sensing network to adjust a capacity of the primary storage location as a percentage of a refrigerating cavity of the plurality of respective interior cavities, wherein the corresponding temperature stratifications includes a plurality of temperature levels that are selectively adjustable based upon the input and an availability of the primary storage location, wherein the respective vertical and lateral locations are defined by a plurality of shelves of the plurality of respective interior cavities; and
  a lighting system that, in response to the input, selectively performs a predetermined lighting sequence based upon a location of the primary storage location within the respective vertical and lateral locations of the refrigerating cavity.

20. The refrigerating appliance of claim 19, wherein the corresponding temperature stratifications and the respective vertical and lateral locations are defined in a vertical direction by the plurality of shelves and in a lateral direction by a plurality of vertical dividers.

* * * * *